United States Patent Office 3,461,034
Patented Aug. 12, 1969

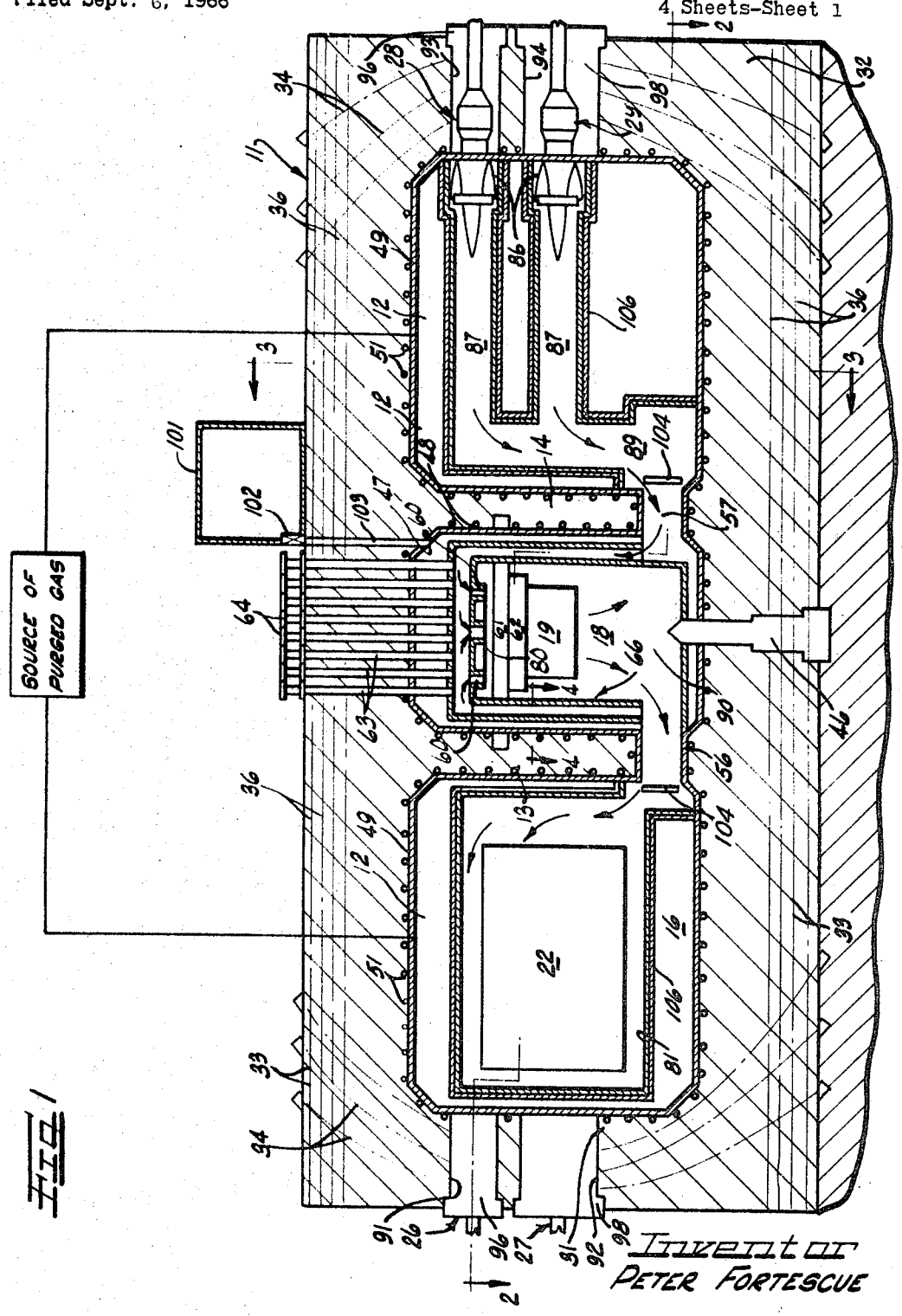

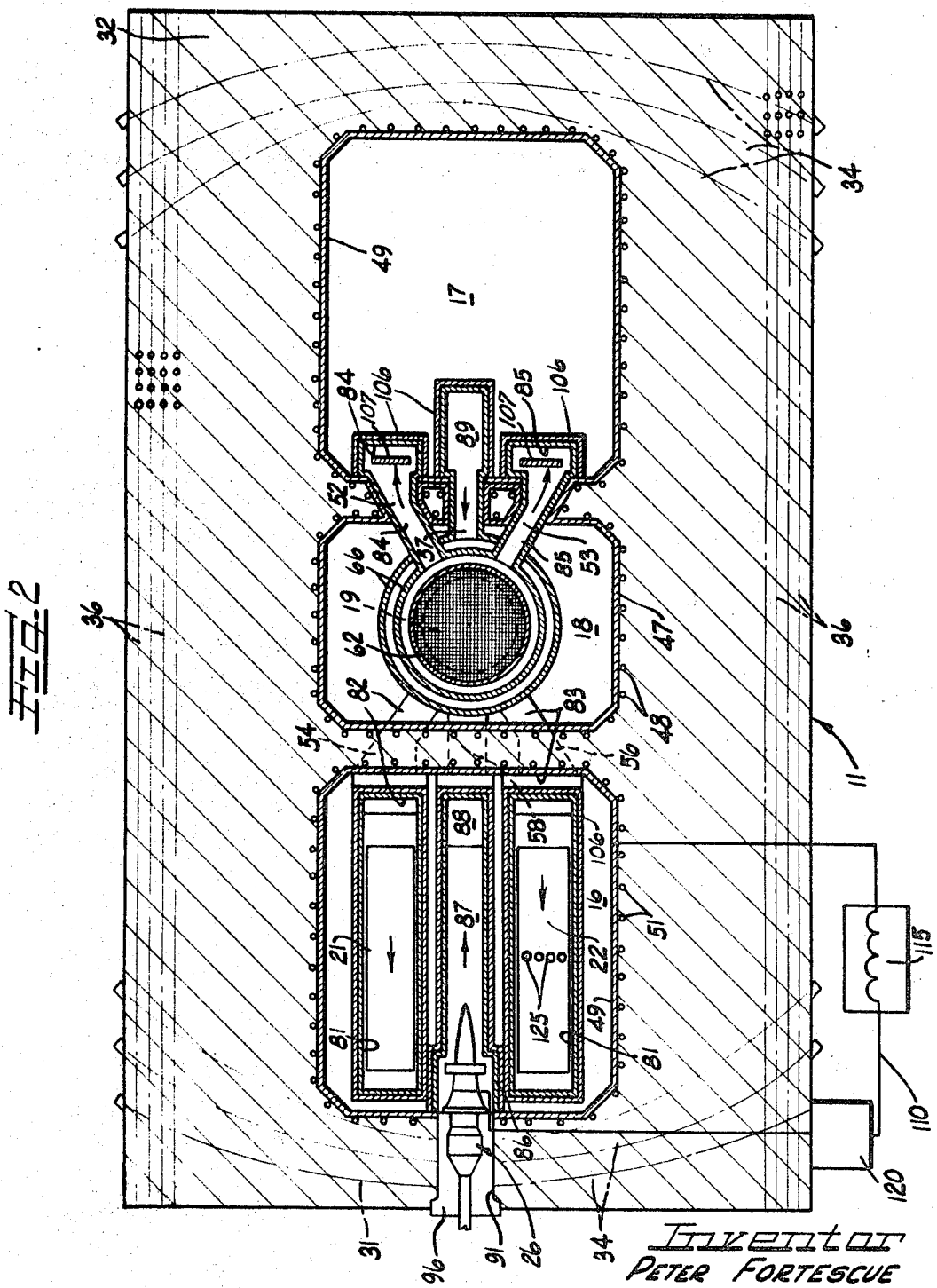

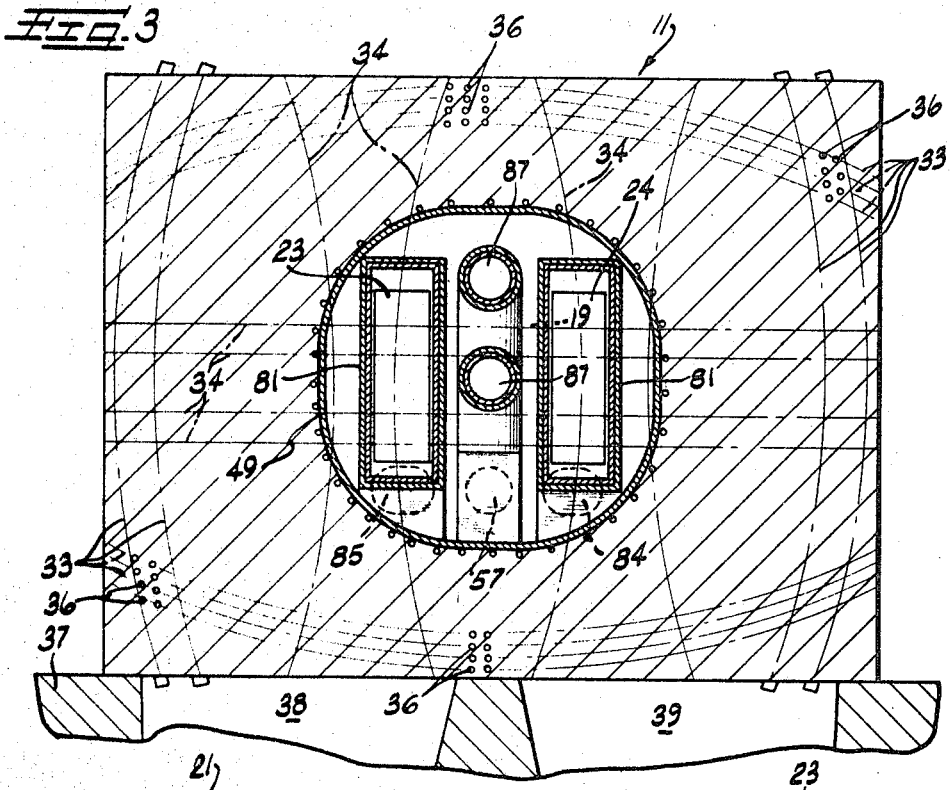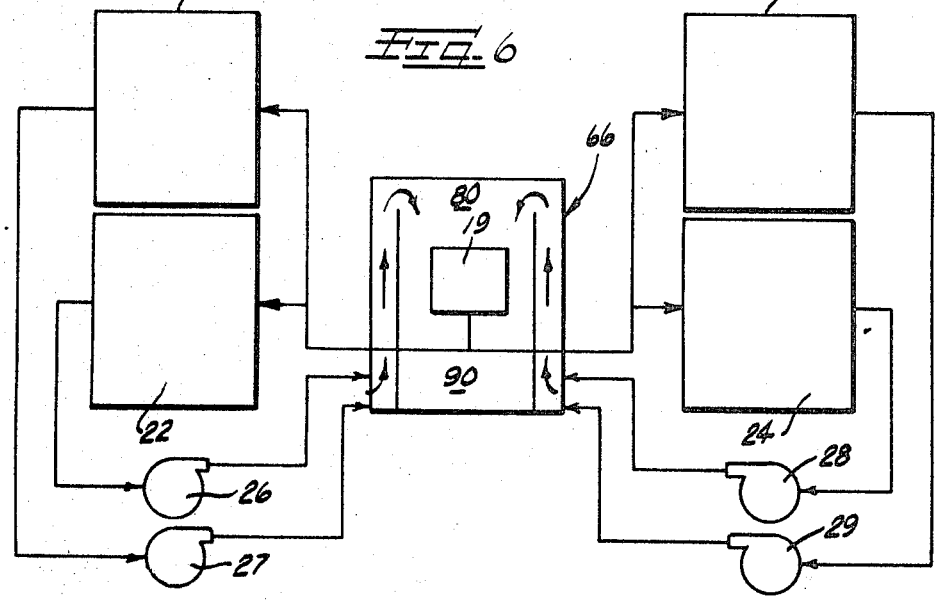

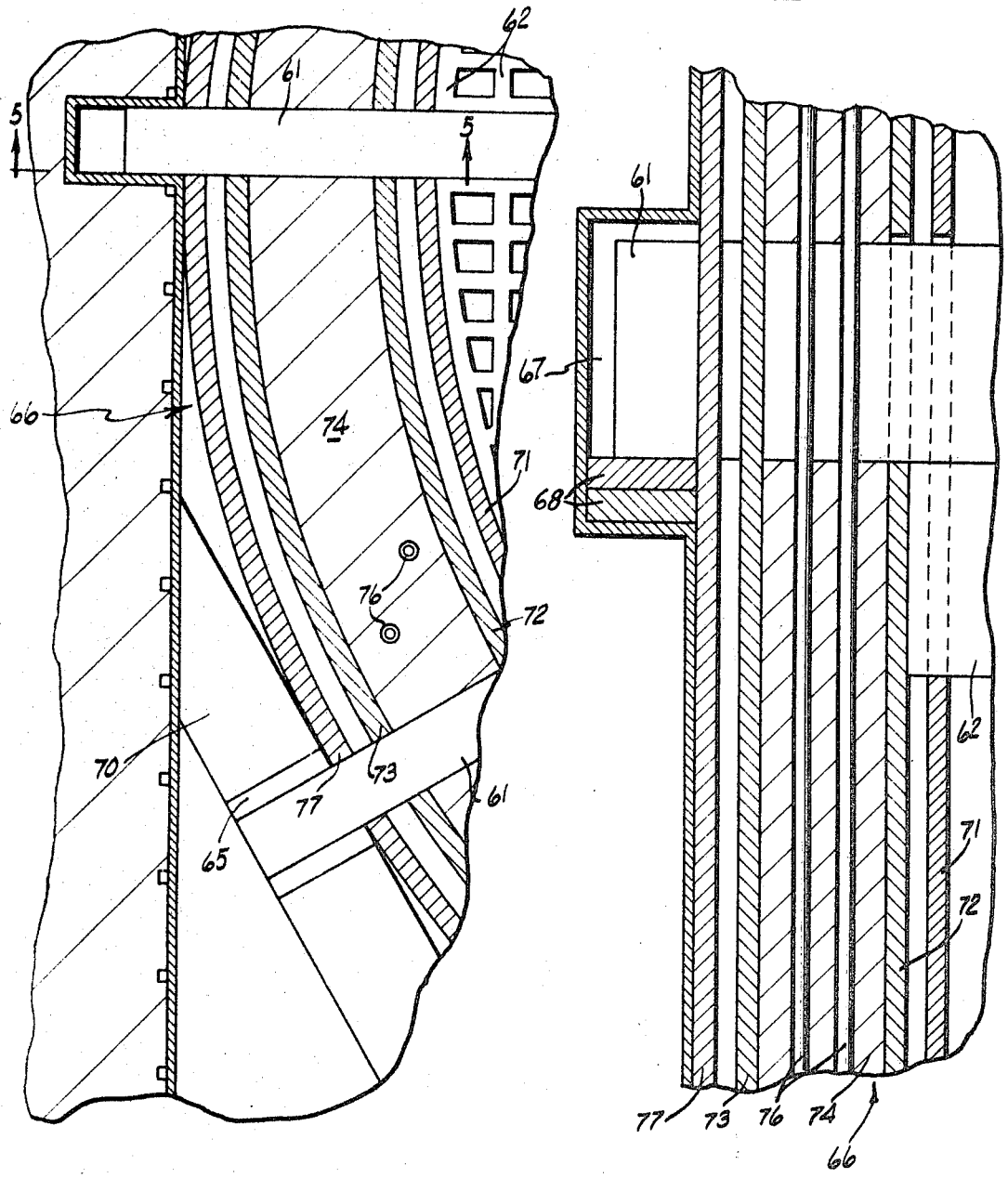

3,461,034
GAS-COOLED NUCLEAR REACTOR
Peter Fortescue, San Diego, Calif., assignor, by mesne assignments, to Gulf General Atomic Incorporated, San Diego, Calif., a corporation of Delaware
Filed Sept. 6, 1966, Ser. No. 577,204
Int. Cl. G21d 9/00; G21c 15/00
U.S. Cl. 176—60          8 Claims

ABSTRACT OF THE DISCLOSURE

A gas-cooled nuclear reactor is described having a prestressed concrete reactor vessel defining an elongated chamber, the latter being divided into three interior compartments. A reactive core is disposed in the middle compartment, and steam generating equipment is positioned in each of the end compartments. An access port is provided in each of the end walls of the reactor to provide access to the end compartments. A biological shield is incorporated within the reactor to reduce radiation from the core in the end compartments.

---

This invention relates to fast nuclear power reactors and, more particularly, to an improved fast nuclear power reactor utilizing a prestressed concrete reactor vessel and using gas as the coolant.

The use of a prestressed concrete reactor vessel for enclosing a fast reactor (i.e., a reactor which operates with neutrons in the fast energy range) has heretofore been suggested. Among the advantages of this form of reactor construction are its relatively low cost and its non-susceptibility to sudden explosive failure. In addition, the use of a plurality of prestressing tendons or strengthening cables tends to mitigate against fault propagation in the reactor vessel since each tendon is independent of the others. The prestressing tendons of the reactor vessel may be placed toward the outside of the reactor vessel, with the vessel thereby acting as a shield to avoid radiation embrittlement of the tendons. The prestressed concrete reactor vessel construction has also been found to be better adapted to erection in the field with less dependence being required on the specialized skill and rigorous inspection associated with the welding of thick metal components.

The copending United States application, Ser. No. 374,908, filed June 15, 1964, and assigned to the present assignee, now abandoned, suggests the use of a prestressed concrete reactor vessel which contains the entire primary system including the core, primary coolant circulators, steam generators, and associated main primary coolant ducting. The fact that external main primary coolant ducts are eliminated by enclosing the entire primary system in the reactor vessel avoids the possibility of a sudden loss of coolant due to ducting failure. Moreover, the elaborate biological shielding, in addition to the reactor vessel, for enclosing the steam generators and main primary coolant ducting that might be necessary to deal with accidental primary circuit contamination becomes unnecessary, since the reactor vessel itself performs this function.

Gas cooling by the use of a gas which is chemically and nuclearly inert relative to the system offers certain advantages over cooling by means of liquid metal, as is frequently used in fast reactors. Among these advantages is that the coolant gas offers a low degree of interaction with nuclear performance by virtue of its lower neutron moderation and absorption. Furthermore, the effects of a coolant loss on reactivity are very small and take place relatively slowly. The overall system in a gas cooled reactor is much less complex than is the case with liquid metal coolants, reducing the cost and complexity of repairs. Moreover, where the gas coolant is compatible with water, the reactor core may be flooded for visual inspection and repair.

Although possessing the aforementioned advantages, presently known gas cooled fast nuclear power reactors utilizing a prestressed concrete reactor vessel enclosing the entire primary system are not without certain problems pertaining to engineering and cost. Some of these problems are peculiar to all types of reactor vessels and some of these problems are due to the nature of prestressed concrete reactor vessels. It is desirable that the steam generators be readily accessible in order to effect replacement and repair thereof, thus presenting the problem of avoiding excessive radiation while effecting such replacement or repair. The fact that the prestressing tendons of a prestressed concrete reactor vessel may interfere with access to the interior of the reactor vessel in many areas presents a further problem. Other problems may arise in providing adequate emergency cooling during various types of accident situations. Also, in the event of an accident situation involving discharge of the steam and coolant water used in the system, a problem is created in avoiding a sudden increase in core reactivity, due to the moderating properties of water. Other problems may be encountered in making it possible to readily shut down the reactor for visual inspection and/or repair of the reactor core, and in providing access to the reactor core for this purpose.

It is an object of the invention to provide an improved fast nuclear reactor.

Another object of the invention is to provide a nuclear reactor of improved construction utilizing a prestressed concrete reactor vessel and a gas coolant.

Still another object of the invention is to provide a gas cooled fast reactor wherein a sudden increase in reactivity resulting from a discharge of system water is avoided.

A further object of the invention is to provide a gas cooled fast reactor utilizing a prestressed concrete reactor vessel containing the entire primary system and wherein access to the reactor core and to steam generating equipment is facilitated.

It is another object of the invention to provide an improved nuclear reactor utilizing a compartmentalized prestressed concrete reactor vessel wherein provision is made for emergency cooling of the reactor core for certain accident situations.

Other objects of the invention and the various advantages of the invention will become apparent to those skilled in the art from the following description take in connection with the accompanying drawings wherein:

FIGURE 1 is an offset section side view of a nuclear reactor (parts of which are shown schematically) constructed in accordance with the invention;

FIGURE 2 is a sectional view taken along the line 2—2 of FIGURE 1;

FIGURE 3 is a sectional view taken along the line 3—3 of FIGURE 1;

FIGURE 4 is an enlarged sectional view taken along the line 4—4 of FIGURE 1;

FIGURE 5 is a sectional view taken along the line 5—5 of FIGURE 4; and

FIGURE 6 is a schematic diagram illustrating the primary coolant flow in the reactor of FIGURES 1 through 3.

Very generally, the nuclear reactor of the invention comprises a prestressed concrete reactor vessel 11 which defines an elongated chamber 12. The chamber is divided by walls 13 and 14 into two end compartments 16 and 17 and a middle compartment 18. A reactive core 19 is disposed within the middle compartment, and steam generators 21, 22, 23 and 24 are disposed within the two end compartments (see FIGURES 2 and 3). Coolant circulators 26, 27, 28 and 29 are provided in the end compartments, and associated ducting and passages direct a coolant through the reactive core and the steam generators to transfer heat from the reactive core to the steam generators for producing steam. The reactor vessel includes means for providing access to each of the two end compartments to permit such operations as repair or replacement of steam generators or coolant circulators. The thickness and material of the dividing walls 13 and 14, and the configuration of the coolant ducting and passages, are designed to biologically shield the end compartments to protect personnel when gaining access to the end compartments. In the reactor of the invention, the end compartments may enclose a ducting arrangement for the primary coolant which confines the coolant to a region displaced from the compartment walls. This enables the compartments to be maintained at a much lower temperature than the coolant.

Referring now in greater detail to the reactor of the invention, the illustrated prestressed concrete reactor vessel 11 is of generally rectangular exterior shape. Other shapes are also possible within the scope of the invention, but it is preferred that there be at least one exterior flat surface for mounting equipment such as control rod drives. An elongated interior chamber 12 is defined by the reactor vessel with the ends of the elongated chamber being terminated by end walls 31 and 32 of the reactor vessel 11.

Although the cross section of the elongated chamber 12 may be of any convenient shape, it is preferred that sharp corners be avoided. A particularly desirable and preferred cross sectional shape is that of a super-circle. The super-circle shape may be seen in FIGURE 3 and may be described as being generally between a square and a circle, having the appearance of a square with rounded corners and slightly curved sides. This form of curve has been described in the publication "Scientific American," September 1965, p. 222 et seq., and offers the advantage of being capable of accomodating generally rectangular or square shapes (such as the shape of many steam generator devices) while providing a very even stress distribution. The formula for the super-circle curve in Cartesian coordinates is $x^n + x^n = 1$, where $2 < n < \infty$. Preferably, in the reactor of the invention, $n$ has a value of about 2½.

As previously mentioned, the reactor vessel is comprised of prestressed concrete, thereby offering certain advantages. Among these advantages is the fact that a prestressed concrete reactor vessel does not fail by sudden explosion, but rather develops excessive leaks. These leaks relieve the internal pressure until the tendons imbedded in the concrete are able to restore a substantial degree of integrity to the reactor vessel. By enclosing the entire primary system in the reactor vessel, no external main coolant ducts are necessary and thereby the danger of rapid coolant loss due to ducting failure is avoided.

Returning now more particularly to the drawings, it will be seen that the tendons, indicated generally by the dash-dot lines, are placed strategically throughout the concrete of the reactor vessel. There are three different types of tendons used to accomplish the prestressing, and these types are referred to herein as side tendons, head tendons, and axial tendons. The tendons may be of any suitable construction, but are preferably wirewound cables having suitable tightening bolts at opposite protruding ends thereof.

The side tendons 33 are located in the concrete of the reactor vessel 11 along the four rectangular sides thereof and extend transversely of the elongated direction of the reactor vessel. As may be seen from FIGURE 3, these tendons bow outwardly slightly in their middle portions and provide a hoop stress for prestressing the reactor vessel in a pseudo-circumferential manner around the chamber 12. By bowing the middle portions of the side tendons outwardly, high stress levels on the inside of the reactor vessel are avoided. Preferably, there is an angle of about 30° between the side tendons at their ends and the side face of the reactor vessel at the point where the tendons are anchored thereto. Some modifications may be made in the positioning of the tendons to permit penetrations of the reactor vessel, which will be explained subsequently.

Head tendons 34 are provided at each end of the reactor vessel in order to apply compressive forces on the ends of the pressure vessel including the end walls 31 and 32. The head tendons extend both horizontally and vertically through the end walls of the reactor vessel, and are bowed toward the ends of the reactor vessel as may be seen in FIGURE 1. As will be explained subsequently, large penetrations are placed centrally of the end walls and the placement of the head tendons, seen in FIGURE 3, is such as to allow space for these penetrations. This is done by separating both the horizontally and vertically extending tendons 34 into two spaced groups, the tendons in each of which are slightly bowed toward each other in their middle portions.

The third type of tendon used in the prestressed concrete reactor vessel 11 is the axial tendon. The axial tendons 36 extend the length of the reactor vessel from end to end and provide a compressive force along the length of the reactor vessel which overcomes the axial forces in the opposite direction produced due to the bowing of the head tendons 34. Because of the penetrations of the end walls 31 and 32, a nonsymmetrical distribution of the head tendons is utilized as previously described. Consequently, the axial tendons are arranged in a similar fashion to suitably overcome the forces produced by the head tendons. The distribution of the axial tendons may be observed in FIGURE 3.

Although it is possible, within the scope of this invention, to dispose the prestressed concrete reactor vessel 11 in any of a variety of positions, it is preferred that the reactor vessel be disposed with its elongated dimension extending horizontally. This means that the vessel may be supported with one of its four elongated rectangular sides resting upon a suitable foundation 37. Tendon galleries 38 and 39 (see FIGURE 3) may be provided in the foundation to permit access to the lower ends of the side tendons 33 and head tendons 34.

The elongated interior chamber 12 is divided into the three compartments 16, 17 and 18 by the pair of spaced biological shield walls 13 and 14. The shield walls extend transversely of the interior chamber 12, generally parallel with the end walls 31 and 32, and separate the chamber into the middle compartment 18 and the pair of end compartments 16 and 17. The walls 13 and 14 are of a material, such as concrete, which is capable of shielding the end compartments from neturons produced in the middle compartment. Where, as in the preferred embodiment, the elongated dimension of the reactor vessel 11 is horizontal, the shield walls 13 and 14 are substantially vertical. This greatly facilitates securing the structural strength and integrity of such walls since they do not have to sustain their necessarily very heavy weight in a direction normal to their faces. The shield walls may be poured integral with the concrete of the reactor vessel.

At this point it should be mentioned that, although the specific size of the reactor vessel 11 is not critical to the invention, the vessel is designed for use in connection with relatively large power reactors. Accordingly, one particular size for the reactor vessel which may be used includes a reactor vessel approximately 35 feet square in its outer dimensions by about 128 feet long. The interior chambers of such a reactor vessel may be approximately 31 feet in their maximum diameters, with the end walls being approximately 15 feet thick. Naturally, other dimensions are possible within the scope of the invention.

The middle compartment 18 of the prestressed concrete reactor vessel 11 is provided with a gastight liner 47. A plurality of coolant coils 48 are welded to the outside of the liner and are embedded in the concrete of the reactor vessel. The liner 47 and the coolant coils 48 are made of a material having, among other characteristics, a high resistance to irradiation damage. Such material may be, for example, a stainless steel or aluminum alloy. Cooling water is passed through these coils to protect the concrete of the reactor vessel from high temperatures within the middle compartment. The liner 47 and coolant coils 48 extend completely around the middle compartment and thereby serve to cool and protect the shield walls 13 and 14.

The walls of the two end compartments 16 and 17 are also lined with a gastight water cooled liner 49 having cooling coils 51 welded thereto. The material used for these walls and cooling coils, as distinguished from the material used for the liner and coils of the middle compartment, does not have to have a high resistance to irradiation damage due in part to the shield walls 13 and 14. This enables the use of material which is lower in cost and more easily fabricated than irradiation resistant materials.

As will be subsequently explained in greater detail, the primary gas coolant is contained within suitable ducts and casings which also enclose the steam generators and gas circulators in the two end compartments. The ducts and casings are insulated to reduce the heat loss from the interior thereof. The cooling coils 51 remove heat from the spaces in the end compartments between the ducts and casings and the liners 49. Additional means, subsequently described, are provided for removing heat from these spaces and provide redundancy for increased reliability. Such spaces may therefore be kept at temperatures which are substantially lower than the coolant gas. These lower temperatures, coupled with the fact that the radiation level in the end compartments is also low, permit the liners 49 and the cooling coils 51 to be fabricated of mild steel. The lower cost and fabrication convenience of mild steel over that of the high temperature and irradiation resistant materials that have to be employed for the corresponding duty in the reactor compartment 18, affords a significant cost saving.

In order to pass the coolant gas between the middle compartment 18 and the two end compartments 16 and 17, three passages are provided in each of the shield walls 13 and 14 near the bottom thereof. The two outer passages 52 and 53 in the shield wall 14 are for passing the hot coolant gas to steam generators which, as will be explained, are located in the end compartment 17. Similarly, the two outer passages 54 and 56 in the shield wall 13 serve to pass the hot coolant gas to steam generators located in the end compartment 16. The middle passages, 57 in the shield wall 14 and 58 in the shield wall 13, are utilized to return the cooled gas to the middle compartment 18 for reheating by the nuclear reactor core 19 located therein. Throughout the drawings, the small arrows are used to indicate the direction of gas coolant flow. Suitable neutron baffles 107 are provided for blocking neutron streaming into the end compartments. Such baffles may comprise a first layer of a light atom material such as beryllia, silica or carbon to slow the neutrons, and a second layer of a hydrogenous material such as boron to absorb the neutrons.

The core 19 of the illustrated reactor is supported from the walls of the prestressed concrete reactor vessel 11 by a plurality of radially extending support members 61. These support members rest on bearing pads 68 disposed in recesses 67 in the walls of the middle compartment 18, or on bearing pads 65 disposed on beams 70 which extend diagonally across the corners of the middle chamber at the proper height.

The reactor core 19 may be of any suitable structure but it is preferred that it be generally of the type shown and described in the previously mentioned copending application, Serial No. 374,908, now abandoned. In this type of core, a grid 62 of substantial height is attached to the underside of the support elements 61 and is suspended across the middle compartment 18 near the top thereof. The grid serves to rigidly support a plurality of elongated fuel elements (not illustrated) which extend downwardly from the grid toward the bottom of the middle compartment and generally parallel with the shield walls 13 and 14. The fuel elements may be surrounded by a radial and axial blanket of fertile material to improve fuel cycle costs. Passages 63 are provided in the top of the reactor vessel 11 (see FIGURE 1) for accommodating control rods, not shown, and their associated drive mechanisms 64.

The core 19 and, if used, the blanket, are preferably surrounded by a thermal shield 66. The thermal shield 66 is designed to reduce the neutron flux reaching the concrete of the reactor vessel 11 to an acceptable level, and to conduct gas coolant in its return flow from the steam generators and direct the coolant down through the core. Since the grid plate 62 is supported from the prestressed concrete reactor vessel, suitable penetrations are provided in the thermal shield structure 66 for the support members 61.

Although the thermal shield structure 66 may be of any suitable construction, a preferred form thereof is shown in FIGURES 4 and 5. The thermal shield structure is preferably comprised of a vertical cylindrical housing closed at both ends. This housing actually includes a plurality of concentric cylinders, the inner cylinder 71 being of steel for thermal shielding. A second concentric cylinder 72 is spaced from the inner cylinder 71 to leave a cap therebetween. As will be subsequently explained, coolant gas returning from the steam generators is passed through this gap in order to cool it before it passes over the reactor core. A third concentric cylinder 73 is spaced from the cylinder 72 and may be of borated steel for absorbing thermal neutrons. The gap between the concentric cylinders 72 and 73 is filled with sand 74 laced with boron frits. The sand moderates fast neutrons and the boron absorbs thermal neutrons. Suitable water cooling tubes 76 are spaced throughout the sand between the two cylinders 72 and 73 in order to cool the thermal insulating structure 66 and the gas passing therethrough. The outermost concentric cylinder 77 is spaced from the cylinder 73 to provide a second passage for coolant gas. The water cooling tubes 76 may be suitably connected by means not illustrated to a water coolant supply which may be the same supply as for the tubes 48 and 51. The top and bottom of the thermal insulation structure 66, not illustrated, may be of identical construction. Suitable passages 60 (see FIGURE 1) are provided for conducting coolant gas to a plenum 80 above the core 19 from the gap between the cylinders 71 and 72 and from the gap between the cylinders 73 and 77.

At the bottom of the middle compartment 18, fuel element handling equipment 46 may be provided for removing spent fuel elements and replacing same. A suitable port through the thermal insulation 66 and the prestressed concrete reactor vessel 11 may be provided for this purpose.

Although any number of steam generators may be utilized in the reactor of the invention, the illustrated embodiment utilizes four steam generators 21, 22, 23 and 24. The steam generators 21 and 22 are located in the end compartment 16, whereas the steam generators 23 and 24 are located in the end compartment 17. Each of the steam generators may comprise a reheater section, a superheater section, and an evaporator-economizer section. Suitable passages, not shown, to the headers of the steam generators may be provided extending through appropriate penetrations in the prestressed concrete reactor vessel 11.

The tube bundles and low pressure headers of the steam generators 21 through 24 are encased in the casing 81. The high pressure headers are located outside the casing 81 in the corresponding end compartments 16 and 17 and are connected to the high pressure tubes, located in the casing 81, by appropriate means, such as tube sheets. The headers are insulated in a manner similar to the ducts and casings. Locating the high pressure headers outside the primary coolant stream avoids a substantial sudden release of steam into the primary loop due to a header rupture. Hot gas ducts 82, 83, 84 and 85 pass through the openings 54, 56, 52 and 53, respectively, and connect the interior of the thermal shield 66 with the interior of the casing around the respective steam generators. The hot coolant gas, after it passes over the reactor core, is collected in a plenum 90 underneath the core and within the thermal shield 66. The coolant gas is then passed through the ducts 82 through 85 to carry hot gas to the various steam generators.

After passing over the various steam generators 21 through 24, the cooled coolant gas is discharged from the casings 81 into four compression chambers 86, one for each of the steam generators. The chambers 86 communicate with the inlet portion of coolant gas circulators 26, 27, 28 and 29, respectively. The coolant gas circulators 26 through 29 may be of any suitable type, but in the case of helium as the coolant gas it is preferred that they each be a two-stage axial flow compressor. The compressor may be directly driven by a single stage steam turbine passing the full reheat flow of the associated steam generator. The latter provides an inherent high efficiency, compactness and quiet and flexible operation. One possible alternative would be an external drive means. This could be accomplished by linking the compressor through a shaft to an externally located parallel fed turbine. One advantage of the latter configuration is that it permits a relatively easy addition of extra drive units in an emergency situation. A purification system, not illustrated, may be provided for monitoring and removing contaminants from the coolant gas.

After receiving the coolant gas from the compression chambers 86, the circulators 26 through 29 compress the gas and force it into a return duct 87 associated with each unit. Each of the return ducts 87 is located between two of the steam generators 21 through 24 and adjacent one of the other return ducts. Thus, there are two return ducts 87 between each pair of steam generators in the respective end compartments 16 and 17. The two return ducts 87 in the compartment 16 communicate with a receiving duct 88. The receiving duct 88 communicates with the two previously discussed gas flow gaps between the concentric cylinders of the shield structure 66 in the compartment 18 through the passage 58. Similarly, the return ducts 87 in the end compartment 17 communicate with the receiving duct 89. The receiving duct 89 passes the returning coolant gas through the passage 57 and into the coolant flow spaces between the concentric cylinders of the thermal shield structure 66.

By referring to FIGURE 6, the general flow diagram for the coolant gas may be seen. After passing over the reactive core and becoming heated, the gas is passed to each of the four steam generators 21 through 24, passed through each of the circulator units 26 through 29, passed through the thermal insulation structure 66, and finally returned to the reactive core 19. Although the invention is not specifically restricted to such an arrangement, it has been found that the described arrangement affords significant advantages in plant efficiency and simplicity of operation.

Each of the end walls 31 and 32 of the prestressed concrete reactor vessel 11 contains two circular penetrations 91 and 92, 93 and 94, respectively. The penetrations 91 and 93 are smaller than the penetrations 92 and 94 and are for containing the two gas circulator units 26 and 28, respectively. A suitable enclosure device 96 is provided in each of the penetrations 91 and 93 for sealing the same about the circulator device. The penetrations 92 and 94, in addition to containing the coolant gas circulator devices 27 and 29, respectively, serve to provide access to the steam generators in the end compartments 16 and 17 for repair and replacement of the various parts of the steam generators. Suitable sealing closure members 98 are provided in each of the penetrations 92 and 94 for sealing same.

The reactive core 19 is supported in the compartment 18 at a distance above the bottom thereof which exceeds the maximum attainable level of water in the event of accidental flooding of the compartment. The required level may be readily computed in accordance with the total volume of coolant water and steam system water in the reactor. Thus, a certain increase in reactivity as a result of water flooding of the core is avoided.

Under certain conditions it may be desirable to cause intentional flooding of the core with water containing a suitable neutron absorber. Provisions are made to permit three types of flooding: active flooding, short-term passive flooding and long-term passive flooding. Active flooding may be carried out to cool the core in an emergency situation such as a sudden loss of coolant and loss of circulation. Active flooding is accomplished by establishing a stream of poisoned water across the top of the core and allowing the water to fall by gravity through the core. To do this, a valve 102 is opened, allowing water to enter the compartment 18 through a passage 103 from a storage tank 101. A sump pump (not shown) at the bottom of the compartment 18 may be used to collect the water and return it through a heat exchanger (not shown) to the top of the compartment 18. Suitable gates 104 are provided at the passages 52, 53, 54, 56, 57 and 58 for confining the poisoned water in the compartment 18. The use of active flooding, as compared with complete flooding of the entire compartment 18, significantly reduces the size of the storage tank and the total inventory of poisoned water needed close by.

Short-term passive flooding refers to complete poisoned water flooding of the entire compartment 18 for short periods of time by additional water supplied from an external source and added through the storage tank 101 and passage 103. It may be utilized for temporary shutdown during which visual inspection and repair of the core or components in the end compartments can be accomplished. Inspection and salvage operations of the core region are aided by the shielding and natural cooling properties of the water and by its optical transparency. Furthermore, natural convection in the water will permit sufficiently long shutdown periods so as to enable such things as steam generator repairs, without the need to resort to forced circulation of any other coolant.

Long-term passive flooding may be utilized for extended periods of non-operation following a major accident. This calls for total flooding of the reactor vessel including the interior of the ducts, casings and passages of the primary coolant loop. By such total flooding, the possibility of failure of the gates 104 and the core becoming exposed is eliminated. Cooling of the core is by natural convection. With regard to all of the flooding system, any suitable means for removing the poisoned water when reactor operation is to be resumed may be provided.

As mentioned before, the void space in the end compartments 16 and 17 is maintained at a relatively cool temperature which is substantially lower than the gas coolant temperature. This is accomplished by providing amounts of thermal insulation 106 completely surrounding the casings, high pressure headers and ducts in such compartments and by providing a suitable cooling means. The cooling coils 51 constitute one cooling means, but an additional cooling means may be provided for redundancy. One such additional cooling means is shown schematically in FIGURE 2 as a continuous bleed circuit 110. A small amount of coolant gas is continuously bled off from the highest pressure point of one of the circulators. This supply is caused to flow through a heat-exchanger or cooler 115 which reduces the temperature of the gas to a desired value. The cooler 115 may be located external to the reactor vessel in which case a purification filter 120 may be located in a recess in the wall of the reactor vessel or immediately adjacent thereto to eliminate a leak of possibly contaminated gas from the externally located parts of the system. A preferred configuration is to locate the cooler inside the associated compartment 16 or 17 and to connect a cooling water supply for the cooler to the steam generator feed water supply. This eliminates a penetration and the requirement for the filter. After being cooled, the gas is fed into the end compartments 16 and 17 where the pressure differential causes the cooled gas to re-enter the main circulation flow through vent holes 125 provided in the casings 81.

The insulation 106 and the cooling provided by the coils 51 and the redundant cooling means make it unnecessary to provide high temperature wall insulation in the end compartments, effecting a considerable cost saving. Because of the absence of high temperatures and the absence of excessive irradiation in the end compartments, it is possible to use relatively low cost material for the insulation 106 and to place electrical control and sensing equipment inside the end compartments. Finally, by leaving the walls of the end compartments 16 and 17 uninsulated but nevertheless water-cooled, an entirely independent internal heat sink is available. This heat sink can be used for the rejection of heat generated under shutdown conditions, even though the steam generators 21–24 are not being utilized for this purpose, by directing a portion of the primary coolant flow over the walls of the end compartments. In the event of a header rupture the walls will serve as condensing surfaces for the steam released. The condensing of the steam will serve to reduce the pressure which would otherwise build up in the end compartments. The condensate may be collected in a sump (not shown) and be drawn off by means of a suitable sump pump. The construction also makes it possible to completely isolate the surroundings of the steam generators from the reactor compartment or middle compartment 18 by providing a slight over-pressure in the end compartments 16 and 17. This causes any leakage between compartments to be towards the middle compartment 18, permitting access to the end compartments for boiler repairs and replacement at all times through the access ports 92 and 94.

Among the other advantages of the construction of the invention is the fact that good access is provided both for the reactor core and for the steam generators by virtue of the horizontal disposition of the prestressed concrete reactor vessel 11. In particular, the shield walls 13 and 14 provide a low radioactivity environment in the end compartments 16 and 17 to permit entry of personnel to effect repairs to the equipment therein. Such construction, together with the described insulation, also permits placement of delicate electrical equipment in the end compartments, and facilitates low cost construction. Access to the reactor core for control rods and fuel handling, and for inspection and repair by suitable devices, is available from either the top or bottom thereof and is unhindered by the steam generating equipment or gas coolant circulators.

It may therefore be seen that the invention provides an improved nuclear reactor which affords particular advantages in gaining access to the internal components thereof, while embodying the attributes associated with prestressed concrete reactor vessels and gas cooling. Certain significant cost reduction features are incorporated in the invention, and complete shutdown of the reactor of the invention is facilitated due to the availability of a heat sink which is independent of the steam generators and due to the fact that the core may be intentionally flooded with poisoned water. Accidental flooding of the core with its attendant dangerous increase in reactivity is avoided due to the core position in the reactor.

Various modifications and other embodiments of the invention in addition to those shown and described herein will be apparent, from the foregoing description, to those skilled in the art. Such other embodiments and modifications thereof are intended to fall within the scope of the appended claims.

What is claimed is:

1. A nuclear reactor comprising, a prestressed concrete reactor vessel defining a chamber, means dividing said chamber into at least two compartments, a reactive core in one of said compartments, vapor generator means disposed in the other of said compartments, means within said chamber for circulating a gaseous coolant through said reactive core and said vapor generator means to transfer heat from said reactive core to said vapor generator means, said coolant circulating means being of a configuration to confine the coolant in said other compartment to a region substantially displaced from the surfaces of said vessel in said other compartment, thermal insulation secured to said coolant circulating means in said other compartment, and means for removing heat from the region between said thermal insulation and the surfaces of said vessel in said other compartment to maintain a temperature therein substantially lower than the temperature of the coolant, and to provide an internal heat sink independent of said vapor generating means for cooling said reactive core.

2. A nuclear reactor in accordance with claim 1, wherein said heat removing means comprise cooling coils in the walls of said vessel in said other compartment.

3. A nuclear reactor comprising, a prestressed concrete reactor vessel defining a horizontally extending elongated chamber, biological shield means extending transversely in said chamber and dividing the chamber into two end compartments and a middle compartment, a reactive core disposed within said middle compartment, steam generator means disposed within said two end compartments, and means within said chamber for circulating a gaseous coolant through said reactive core and said steam generator means to transfer heat from said reactive core to said steam generator means for producing steam, said reactive core being located at a distance above the bottom of said middle compartment which exceeds the maximum attainable level of all the steam generator supply water in said reactor in the event of flooding.

4. A nuclear reactor comprising, a prestressed concrete reactor vessel defining an elongated chamber, biological shield means extending transversely in said chamber and dividing the chamber into two end compartments and a middle compartment, a reactive core disposed within said middle compartment, steam generator means disposed within said two end compartments, means within said chamber for circulating a gaseous coolant through said reactive core and said steam generator means to transfer heat from said reactive core to said steam generator means for producing steam, said reactor vessel having means for permitting access to each of said end compartments, and means for maintaining the pressure in said two end compartments higher than the pressure in said middle compartment, whereby any leakage between said compartments is directed to said middle compartment.

5. A nuclear reactor comprising, a prestressed concrete reactor vessel defining an elongated chamber the cross section of which has the outline of a supercircle, said reactor vessel having a pair of opposite end walls disposed generally transversely of the elongated chamber, biological shield means extending transversely in said chamber and dividing the chamber into two end compartments and a middle compartment, a reactive core disposed within said middle compartment, steam generator means disposed within said two end compartments, and means within said chamber for circulating a gaseous coolant through said reactive core and said steam generator means to transfer heat from said reactive core to said steam generator means for producing steam, said end walls each having an access port therein for providing access to each of said end compartments, said biological shield means being of a configuration to protect personnel from raidation during periods of access to said end compartments.

6. A nuclear reactor in accordance with claim 4 wherein said biological shield means include a pair of spaced concrete walls of a thickness to protect personnel from radiation during periods of access to said end compartments, said walls having passages therethrough for conducting coolant from said middle compartment to each of said end compartments and for returning the coolant toward said middle compartment, said biological shield means further including baffles for blocking the passage of radiation through said passages to said end compartments.

7. A nuclear reactor in accordance with claim 4 wherein means are provided for flooding said middle compartment with water containing neutron absorbers, and for confining such water to said middle compartment.

8. A nuclear reactor in accordance with claim 4 wherein the cross section of said elongated chamber has the outline of a supercircle.

References Cited
UNITED STATES PATENTS

| | | | |
|---|---|---|---|
| 3,091,582 | 5/1963 | Bradley | 176—60 |
| 3,115,450 | 12/1963 | Schantz | 176—38 |
| 3,205,140 | 9/1965 | Coudray et al. | 176—60 |
| 3,296,082 | 1/1967 | Lemesle et al. | 176—60 X |
| 3,297,542 | 1/1967 | Costes | 176—60 |
| 3,305,451 | 2/1967 | Taylor et al. | 176—60 |

FOREIGN PATENTS

| | | |
|---|---|---|
| 866,037 | 4/1961 | Great Britain. |
| 936,198 | 9/1963 | Great Britain. |

REUBEN EPSTEIN, Primary Examiner

U.S. Cl. X.R.

176—38, 65, 87